United States Patent
Wilson et al.

[11] Patent Number: 6,131,481
[45] Date of Patent: Oct. 17, 2000

[54] STEERING COLUMN

[75] Inventors: Erik C. Wilson; Albert E. Becker, Jr., both of West Lafayette, Ind.

[73] Assignee: TRW Inc., Lyndhurst, Ohio

[21] Appl. No.: 09/196,018

[22] Filed: Nov. 19, 1998

[51] Int. Cl.⁷ ........................................................ B62D 1/18
[52] U.S. Cl. ................................................ 74/493; 74/492
[58] Field of Search ........................... 74/493, 492, 491; 280/777

[56] References Cited

U.S. PATENT DOCUMENTS

| | | |
|---|---|---|
| 2,304,356 | 12/1942 | Heller . |
| 3,548,675 | 12/1970 | Crimes et al. . |
| 4,594,909 | 6/1986 | Yamagvchi ............................... 74/493 |
| 4,972,732 | 11/1990 | Venable et al. . |
| 5,029,489 | 7/1991 | Burmeister et al. . |
| 5,052,240 | 10/1991 | Mihoshi et al. . |
| 5,222,410 | 6/1993 | Kinoshita . |
| 5,363,716 | 11/1994 | Budzik, Jr. et al. . |
| 5,503,431 | 4/1996 | Yamamoto . |
| 5,524,927 | 6/1996 | Toussaint . |
| 5,566,585 | 10/1996 | Snell et al. . |
| 5,606,892 | 3/1997 | Hedderly . |
| 5,813,289 | 9/1998 | Renick et al. . |
| 5,823,062 | 10/1998 | Snell et al. ................................ 74/493 |
| 5,921,577 | 7/1999 | Weiss et al. ............................... 74/493 |
| 6,036,228 | 3/2000 | Olgren et al. .............................. 74/493 |

FOREIGN PATENT DOCUMENTS

0818379A2 1/1998 European Pat. Off. .
2311839A 10/1997 United Kingdom .

OTHER PUBLICATIONS

A copy of an European Search Report dated Feb. 21, 2000.

*Primary Examiner*—David Fenstermacher
*Attorney, Agent, or Firm*—Tarolli, Sundheim, Covell, Tummino & Szabo L.L.P.

[57] ABSTRACT

A steering column connectable to a frame of a vehicle includes a first steering column member pivotable relative to a second steering column member. A tilt lock bar has an end portion movable with the first steering column member relative to the second steering column member. The tilt lock bar moves relative to the second steering column member upon pivoting of the first steering column member to any one of a plurality of pivot positions relative to the second steering column member. A locking member engages a plurality of teeth on the tilt lock bar to prevent movement of the tilt lock bar relative to the second steering column member and pivoting of the first steering column member relative to the second steering column member. The locking member has a first position engaging the plurality of teeth on the tilt lock bar to prevent movement of the tilt lock bar relative to the second steering column member. The locking member has a second position spaced from the plurality of teeth on the tilt lock bar to enable movement of the tilt lock bar relative to the second steering column and pivoting of the first steering column member relative to the second steering column member. A support tube for connecting the steering column to the frame of the vehicle rotatably supports the second steering column member.

20 Claims, 5 Drawing Sheets

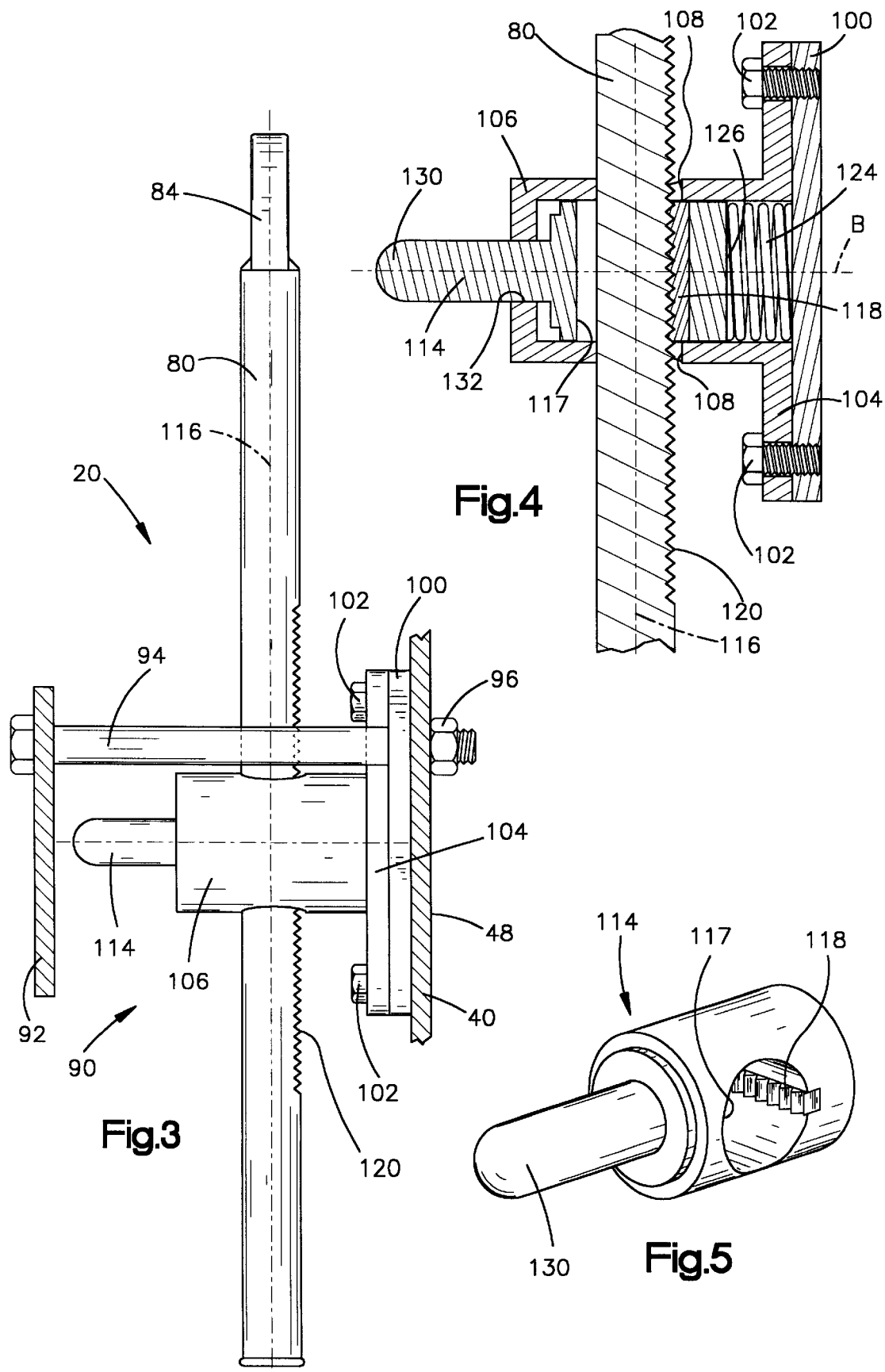

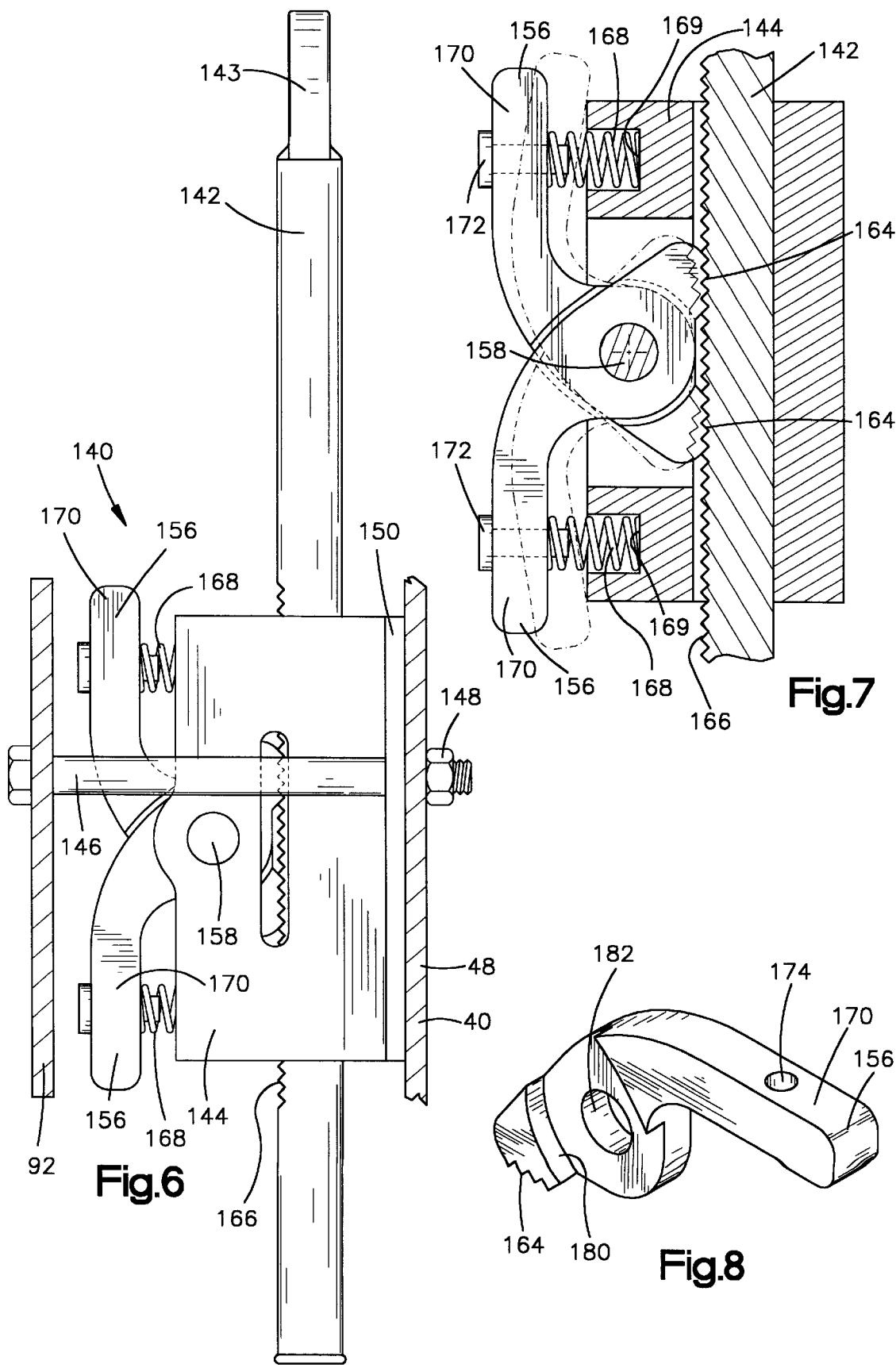

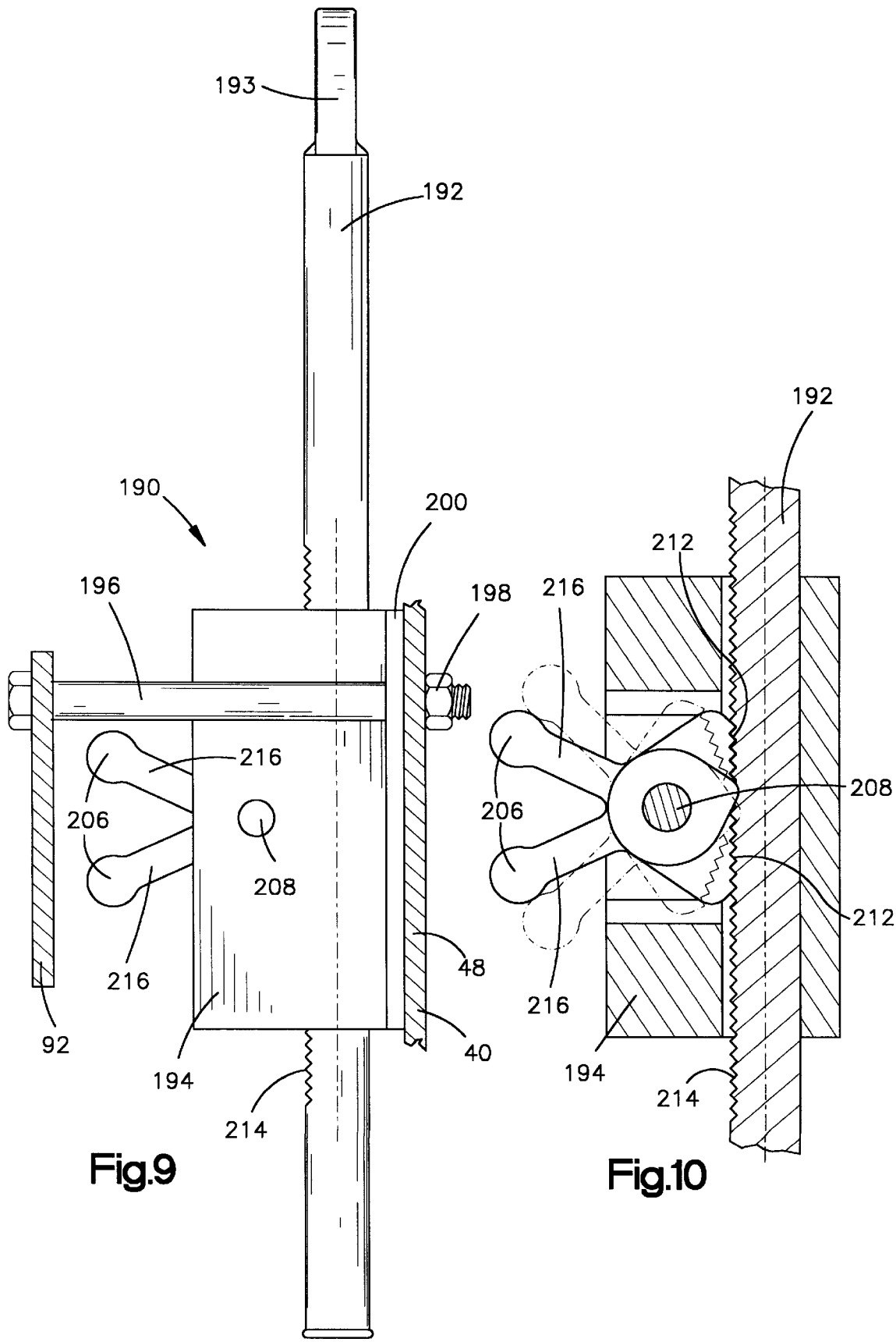

6,131,481

STEERING COLUMN

TECHNICAL FIELD

BACKGROUND OF THE INVENTION

The present invention relates to a steering column, and more specifically to a steering column in which a first steering column member is pivotable relative to a second steering column member.

A known steering column is disclosed in U.S. Pat. No. 5,363,716. U.S. Pat. No. 5,363,716 discloses a steering column in which a first steering column member can be pivoted relative to a second steering column member. A tilt lock bar has a first end portion movable with the first steering column member relative to the second steering column member. The tilt lock bar moves relative to the second steering column member upon pivoting of the first steering column member to any one of a plurality of pivot positions relative to the second steering column member. A pair of coil springs are normally tightly wound around the periphery of the tilt lock bar so that, when fully wound, they grip the tilt lock bar and prevent relative movement between the tilt lock bar and the second steering column member. Rotation of a lever about an axis of the tilt lock bar causes the springs to become partially unwound and release their grip on the tilt lock bar. When the springs become unwound, the first steering column member can be pivoted relative to the second steering column member.

SUMMARY OF THE INVENTION

The steering column of the present invention includes first and second steering column members pivotable relative to each other. A tilt lock bar has an end portion movable with the first steering column member relative to the second steering column member. The tilt lock bar is movable relative to the second steering column member upon pivoting of the first steering column member to any one of a plurality of pivot positions relative to the second steering column member.

A locking means for engaging a plurality of teeth on the tilt lock bar prevents movement of the tilt lock bar relative to the second steering column member and pivoting of the first steering column member relative to the second steering column member. The locking means has a first position engaging the plurality of teeth on the tilt lock bar to prevent movement of the tilt lock bar relative to the second steering column member and pivoting of the first steering column member relative to the second steering column member. The locking means has a second position spaced from the plurality of teeth on the tilt lock bar to enable movement of the tilt lock bar relative to the second steering column member and pivoting of the first steering column member relative to the second steering column member. A mounting means for connecting the steering column to the frame of the vehicle rotatably supports the second steering column member.

In one embodiment of the present invention, the locking means applies a first force to the tilt lock bar to prevent movement of the tilt lock bar relative to the second steering column member. The locking means includes means for applying a second force to the tilt lock bar greater than the first force when a load is applied to the first steering column member urging the first steering column member to pivot relative to the second steering column member.

BRIEF DESCRIPTION OF THE DRAWINGS

The foregoing and other features of the present invention will become more apparent to one skilled in the art upon consideration of the following description of the invention and the accompanying drawings in which:

FIG. 3 is an enlarged view of a locking means for locking the steering column in a desired adjusted position;

FIG. 4 is an enlarged sectional view of a portion of the locking means of FIG. 3;

FIG. 5 is a pictorial view of a piston of the locking means of FIG. 3;

FIG. 6 is an enlarged schematic view of a second embodiment of a locking means of the present invention;

FIG. 7 is a sectional view of the locking means of FIG. 6;

FIG. 8 is a pictorial view of an actuation arm of the locking means of FIG. 6;

FIG. 9 is an enlarged schematic view of a third embodiment of a locking means of the present invention; and FIG. 10 is a sectional view of the locking means of FIG. 9.

DESCRIPTION OF PREFERRED EMBODIMENTS

Figure 1:
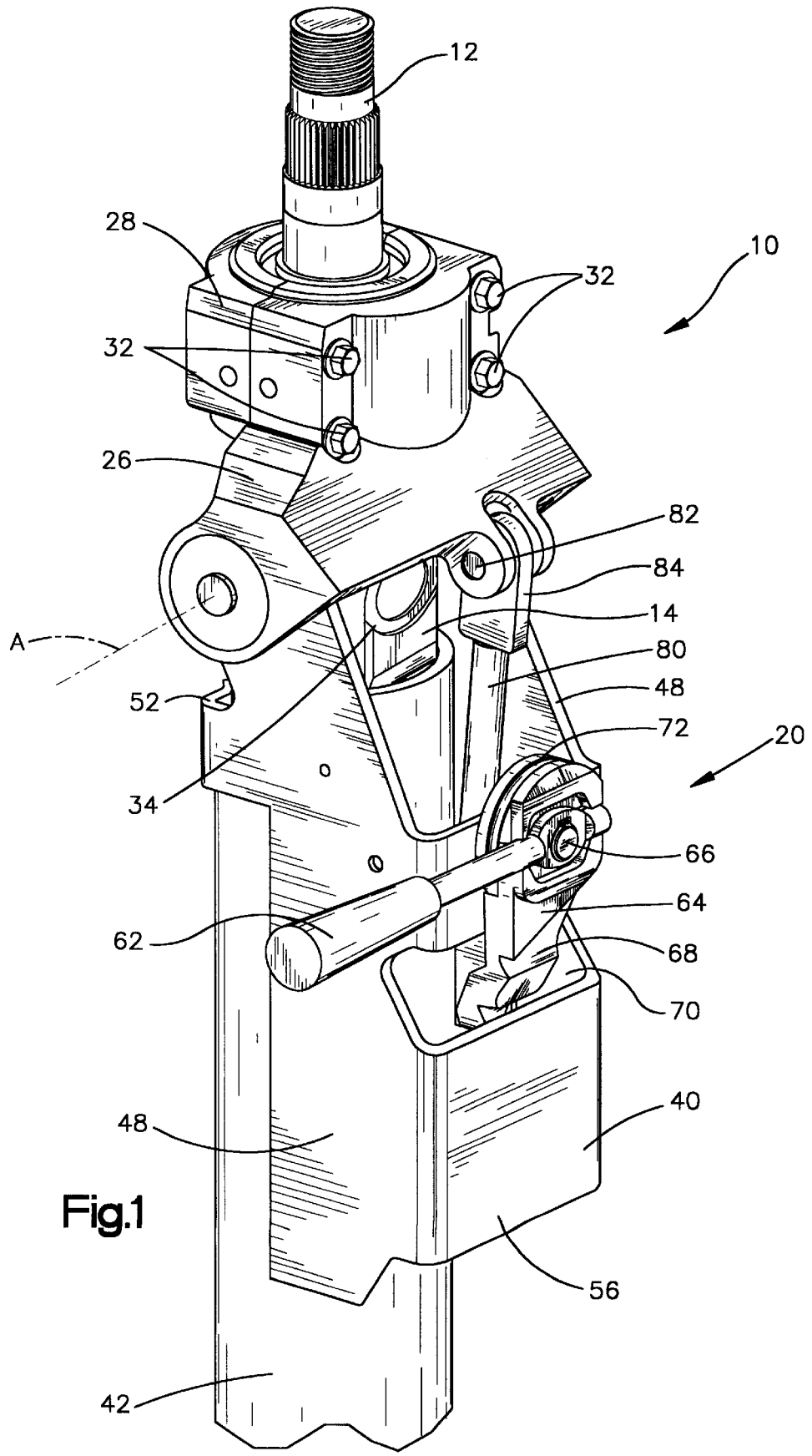
FIG. 1 is a pictorial illustration of a first embodiment of a steering column of the present invention.
Figure 2:
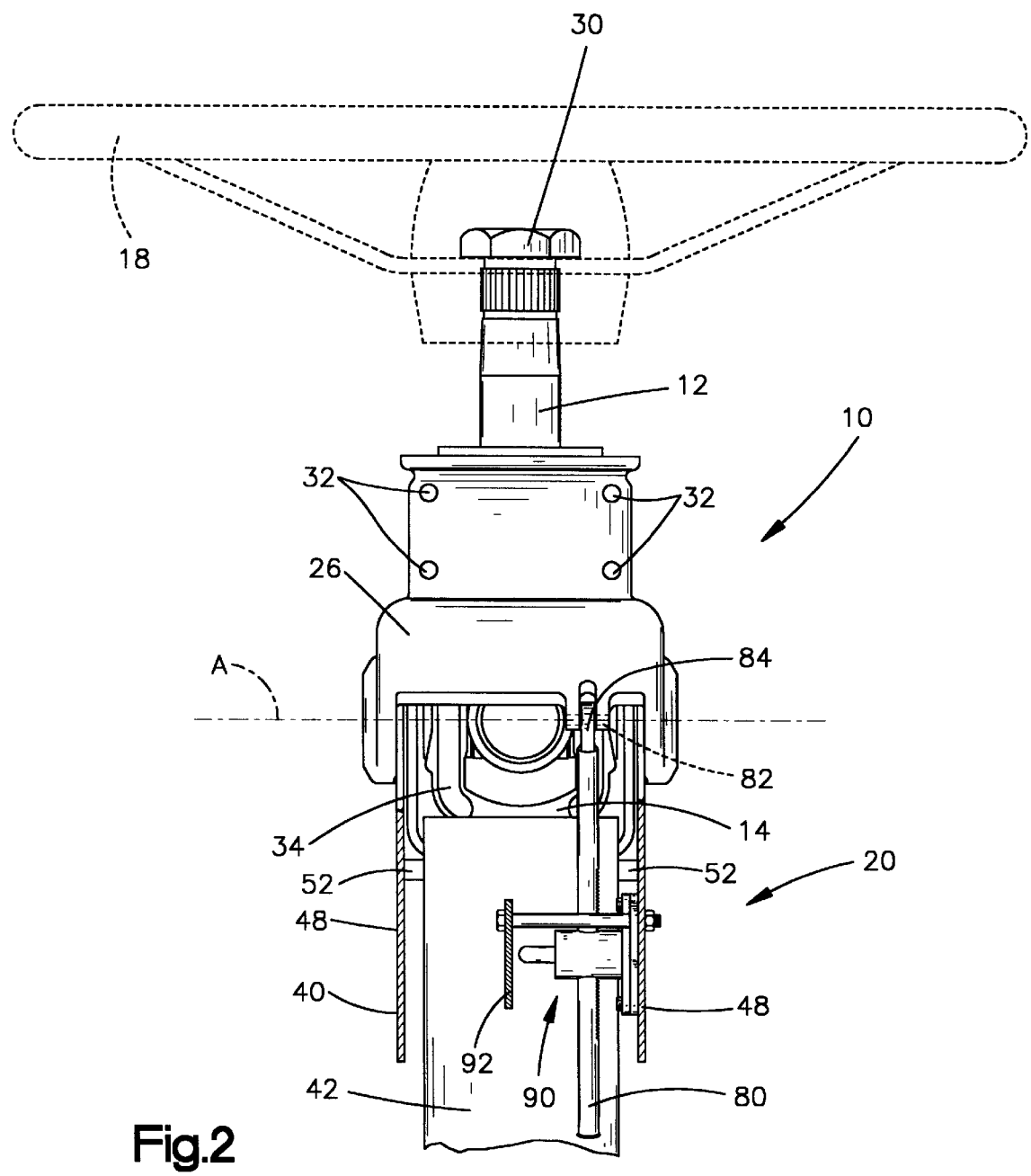
FIG. 2 is a schematic sectional view of a portion of the steering column of FIG. 1.

A first embodiment of the present invention comprises an angularly adjustable vehicle steering column 10 (FIGS. 1 and 2). The steering column 10 is connectable to a frame of a vehicle by mounting brackets (not shown), as is well known in the art. The steering column 10 includes an input shaft or steering column member 12 and a steering column member 14 which are rotatable to move steerable wheels of a vehicle (not shown). A vehicle steering wheel 18 (FIG. 2) is attached to the steering column member 12 by a nut 30. The steering column member 12 and steering column member 14 rotate upon rotation of the vehicle steering wheel 18 by an operator of the vehicle. The steering column member 12 is pivotable relative to the steering column member 14 to affect angular adjustment of the steering wheel 18.

A releasable tilt locking mechanism 20 (FIG. 1) locks the steering column member 12 in any one of a plurality of pivot positions relative to the steering column member 14. The steering column member 12 extends into an upper housing 26. Bearings located in the upper housing 26 support the steering column member 12 for rotation relative to the upper housing. A cover 28 is removable from the upper housing 26 so that the bearings may be reached for repair and maintenance. The cover 28 (FIG. 1) is connected to the upper housing 26 by screws 32.

A universal joint 34 (FIGS. 1 and 2) interconnects the steering column members 12, 14. The steering column member 12 is connected to one yoke of the universal joint 34. Another yoke of the universal joint 34 is connected to the steering column member 14. The steering column member 12 and upper housing 26 can pivot, relative to the steering column member 14, about a pivot axis A of the universal joint 34. From the above, it should be clear that upon rotation of the steering wheel 18, the steering column member 12 and the steering column member 14 rotate.

A bracket 40 (FIG. 1) pivotally supports the upper housing 26 and steering column member 12 for pivotal is movement relative to the steering column member 14. The upper housing 26 is pivotally connected to the bracket 40 which is connected to a mounting member or support tube 42 circumscribing the steering column member 14. The support tube 42 supports the steering column member 14 for rotation and connects the steering column 10 to the frame of the vehicle, as is well known in the art. The upper housing 26 is pivotable about the axis A relative to the bracket 40 and the support tube 42. Therefore, the upper housing 26 pivots along with the steering column member 12 relative to the bracket 40 and the steering column member 14.

The bracket 40 (FIG. 1) includes generally parallel side walls 48. Portions 52 extending radially inwardly from the side walls 48 are connected to an upper portion of the support tube 42. A portion 56 of the bracket 40 extends between the side walls 48. The bracket 40 partially encloses the tilt locking mechanism 20.

A handle 62 and actuator member 64, connected to the handle, are pivotally mounted on the portion 56 of the bracket 40 by a pin 66. The handle 62 and actuator member 64 release the tilt locking mechanism 20 to permit tilting of the steering column member 12 relative to the steering column member 14. A portion 68 of the actuator member 64 extends into an opening 70 in the portion 56 of the bracket 40 and engages the tilt locking mechanism 20. A torsion spring 72 extends around the actuator member 64 to bias the handle 62 and the actuator member to an initial position in which the tilt locking mechanism 20 is locked.

A tilt lock bar 80 is pivotally connected to the upper housing 26 by a pin 82. An end portion 84 of the tilt lock bar moves with the steering column member 12 relative to the steering column member 14. A piston-cylinder assembly 90 (FIGS. 3 and 4) locks the tilt lock bar 80 in one of a plurality of positions relative to the steering column member 14.

When the tilt lock bar 80 is locked in one of the positions, the steering column member 12 is locked in one of a plurality of positions relative to the steering column member 14. The tilt lock bar 80 extends through the piston-cylinder assembly 90 (FIGS. 3 and 4) which locks the tilt lock bar 80 in one of the plurality of positions. The piston-cylinder assembly 90 is pivotally connected between one of the side walls 48 and a flange 92 extending from the portion 56 of the bracket 40 by a bolt 94 and nut 96. The bolt 94 extends through a plate 100 of the piston-cylinder assembly 90. The plate 100 is connected by screws 102 to a flange 104 extending from a cylindrical housing 106 of the piston-cylinder assembly 90.

The tilt lock bar 80 (FIG. 4) extends through openings 108 in the housing 106. A piston 114 located within the housing 106 is movable transverse to a longitudinal axis 116 of the tilt lock bar 80. The piston 114 has an oval-shaped opening 117 through which the tilt lock bar 80 extends to permit movement of the piston relative to the tilt lock bar. A plurality of teeth 118 define a portion of the opening 117. The teeth 118 engage teeth 120 on the tilt lock bar 80 to prevent movement of the tilt lock bar relative to the housing 106, and therefore, the bracket 40 and the steering column member 14.

A spring 124 located within the cylindrical housing 106 urges the piston 114 to the left, as viewed in FIG. 4, so that the teeth 118 engage the teeth 120 of the tilt lock bar 80. The spring 124 acts between a surface 126 of the piston 114 and the plate 100. An extension 130 of the piston 114 extends through an opening 132 in the housing 106. The extension 130 engages the portion 68 of the actuator member 64.

Upon pivoting the handle 62 and, therefore, the actuator member 64, downward, as viewed in FIG. 1, from the initial position, the portion 68 of the actuator member moves toward the piston-cylinder assembly 90. The actuator member 64 moves the piston 114 to the right, as viewed in FIG. 4, to release the tilt lock bar 80 and permit pivoting of the steering column member 12 relative to the steering column member 14. When the steering column member 12 is pivoted relative to the steering column member 14, the tilt lock bar 80 moves relative to the piston-cylinder assembly 90 and the piston-cylinder assembly pivots about the bolt 94. Upon release of the handle 62 after positioning the steering column member 12, the spring 124 moves the teeth 118 on the piston 114 into engagement with the tilt lock bar 80. The spring 72 and the piston 114 move the handle 62 and the actuator member 64 to the initial position.

The embodiment of the invention illustrated in FIGS. 6–8 is generally similar to the embodiment of the invention illustrated in FIGS. 1–5. The embodiment of FIGS. 6–8 is the same as the embodiment of FIGS. 1–5 with a different locking mechanism.

A tilt locking mechanism 140 of the second embodiment (FIGS. 6 and 7) locks the steering column member 12 in any one of a plurality of pivot positions relative to the steering column member 14. A tilt lock bar 142 is pivotally connected to the upper housing 32. An end portion 143 of the tilt lock bar 142 moves with the steering column member 12 relative to the steering column member 14. The tilt lock bar 142 extends through a locking housing 144. The locking housing 144 is pivotally connected between one of the side walls 48 and the flange 92 of the bracket 40 by a bolt 146 and a nut 148. The bolt 146 extends through a mounting flange 150 of the housing 144.

A pair of actuator arms 156 are pivotally connected to the housing 144 by a pivot pin 158. Each of the actuator arms 156 has teeth 164 (FIG. 7) for engaging teeth 166 on the tilt lock bar 142. The teeth 164 on the actuator arms 156 are biased into engagement with the teeth 166 on the lock bar 142 by springs 168 located in recesses 169 in the housing 144.

The springs 168 engage extensions 170 of the actuator arms 156 to cause the actuator arms to pivot into engagement with the tilt lock bar 142. Pins 172 extend through openings 174 (FIG. 8) in the extensions 170 and into the interior of the springs 168 to position the springs 168 on the extensions 170.

The actuator arms 156 are substantially similar and, therefore, only one of the actuator arms will be described in detail. The actuator arm 156 (FIG. 8) includes a recess 180 for receiving a portion of the other actuator arm 156. The actuator arm 156 includes an opening 182 through which the pin 158 extends. Each of the extensions 170 on the actuator arms 156 engages the portion 68 of the actuator member 64.

Upon pivoting the portion 68 of the actuator member 64 toward the locking mechanism 140 from the initial position, the actuator arms 156 pivot in opposite directions about the pin 158. The teeth 164 on the actuator arms 156 move out of engagement with the tilt lock bar 142 to permit pivoting of the steering column member 12 relative to the steering column member 14. When the steering column member 12 is pivoted relative to the steering column member 14, the tilt lock bar 142 moves relative to the housing 144 and the housing 144 pivots about the bolt 146. Upon release of the handle 62 after positioning the steering column member 12 relative to the steering column member 14, the teeth 164 on the actuator arms 156 move into engagement with the tilt lock bar 142. The spring 72 and the actuator arms 156 move the handle 62 to the initial position.

Each of the actuator arms 156 applies a first force against the tilt lock bar 142 under the influence of springs 164 and 72. When a load is applied to the steering column member 12 which urges the steering column member to pivot about the axis A and the actuator arms 156 are engaging the tilt lock bar 142, the force applied by one of the actuator arms 156 on the tilt lock bar increases to a second force. When a load is applied to the steering column member 12, the load is transmitted to the tilt lock bar 142. The tilt lock bar 142 transmits the load to one of the actuator arms 156 which urges the actuator arm to pivot about the pin 158 toward engagement with the tilt lock bar. Accordingly, the actuator arm 156 applies a larger force on the tilt lock bar 142 to further prevent tilting of the steering column member 12.

The embodiment of the invention illustrated in FIGS. 9 and 10 is generally similar to the embodiments illustrated in FIGS. 1–8. The embodiment of FIGS. 9 and 10 is the same as the embodiments of FIGS. 1–8 with a different locking mechanism.

A tilt locking mechanism 190 of the third embodiment (FIGS. 9 and 10) locks the steering column member 12 in any one of a plurality of pivot positions relative to the steering column member 14. A tilt lock bar 192 is pivotally connected to the upper housing 32. An end portion 193 of the tilt lock bar 192 moves with the steering column member 12 relative to the steering column member 14. The tilt lock bar 192 extends through a locking housing 194. The locking housing 194 is pivotally connected between one of the side walls 48 and the flange 92 of the bracket 40 by a bolt 196 and a nut 198. The bolt 196 extends through a mounting flange 200 of the housing 194.

A pair of actuator arms 206 are pivotally connected to the housing 194 by a pin 208. Each of the actuator arms 206 has teeth 212 for engaging teeth 214 on the tilt lock bar 192. The teeth 212 on the actuator arms 206 are biased into engagement with the teeth 214 on the tilt lock bar 192 by a spiral spring (not shown) wrapped around the pin 208. Each of the actuator arms 206 has a portion 216 in engagement with the portion 68 of the actuator member 64.

Upon pivoting the portion 68 of the actuator member 64 toward the locking mechanism 190 from the initial position, the actuator arms 206 pivot in opposite directions about the pin 208. The teeth 212 on the actuator arms 206 move out of engagement with the tilt lock bar 192 to permit pivoting of the steering column member 12 relative to the steering column member 14. When the steering column member 12 is pivoted relative to the steering column member 14, the tilt lock bar 192 moves relative to the housing 194 and the housing 194 pivots about the bolt 196. Upon release of the handle 62 after positioning the steering column member 12 relative to the steering column member 14, the teeth 212 on the actuator arms 206 move into engagement with the tilt lock bar 192. The spring 72 and the actuator arms 206 move the handle 62 to the initial position.

From the above description of the invention, those skilled in the art will perceive improvements, changes and modifications. It is contemplated that the tilt lock bars may be smooth so that an infinite adjustment of the tilt position of the steering column may be obtained. Furthermore, it is contemplated that the steering columns may be tilt-telescope steering columns in which the length of the steering column may be adjusted also. Such improvements, changes and modifications within the skill of the art are intended to be covered by the appended claims.

Having described the invention, the following is claimed:

1. A steering column connectable to a frame of a vehicle, said steering column comprising:

first and second steering column members, said first steering column member being pivotable relative to said second steering column member;

a tilt lock bar having an end portion movable with said first steering column member relative to said second steering column member, said tilt lock bar moving relative to said second steering column member upon pivoting of said first steering column member to any one of a plurality of pivot positions relative to said second steering column member, said tilt lock bar having a plurality of teeth;

locking means for engaging said plurality of teeth on said tilt lock bar to prevent movement of said tilt lock bar relative to said second steering column member and prevent pivoting of said first steering column member relative to said second steering column member, said locking means having a first position engaging said plurality of teeth on said tilt lock bar to prevent movement of said tilt lock bar relative to said second steering column member and a second position spaced from said plurality of teeth on said tilt lock bar to enable movement of said tilt lock bar relative to said second steering column member and pivoting of said first steering column member relative to said second steering column member; and mounting means for connecting said steering column to the frame of the vehicle, said mounting means rotatably supporting said second steering column member.

2. A steering column as set forth in claim 1 wherein said locking means includes a plurality of teeth engageable with said plurality of teeth on said tilt lock bar.

3. A steering column as set forth in claim 1 further including means for biasing said locking means into engagement with said tilt lock bar.

4. A steering column as set forth in claim 1 wherein said locking means includes a piston and means supporting said piston for movement in a direction transverse to a longitudinal axis of said tilt lock bar, said piston having a plurality of teeth engageable with said plurality of teeth on said tilt lock bar to prevent movement of said tilt lock bar relative to said second steering column member.

5. A steering column as set forth in claim 4 wherein said piston includes surface means defining an opening through which said tilt lock bar extends, said plurality of teeth of said piston being located on said surface means defining the opening in said piston.

6. A steering column as set forth in claim 4 wherein said means supporting said piston for movement is pivotally connected with said mounting means.

7. A steering column as set forth in claim 1 wherein said locking means includes a first member pivotable about a pivot axis spaced from said tilt lock bar, said first member having a first portion engageable with said plurality of teeth on said tilt lock bar.

8. A steering column as set forth in claim 7 further including spring means for applying a force to urge said first member to pivot about the pivot axis and said first portion toward engagement with said plurality of teeth on said tilt lock bar.

9. A steering column as set forth in claim 8 further including actuator means engageable with a second portion of said first member for pivoting said first member about the pivot axis and said first portion away from said plurality of teeth on said tilt lock bar.

10. A steering column as set forth in claim 7 further including support means for supporting said first member for pivotal movement about the pivot axis, said supporting means being pivotal relative to said mounting means.

11. A steering column as set forth in claim 7 wherein said first portion of said first member includes a plurality of teeth engageable with said plurality of teeth on said tilt lock bar.

12. A steering column as set forth in claim 7 wherein said locking means includes a second member pivotable about said pivot axis, said second member having a first portion engageable with said plurality of teeth on said tilt lock bar.

13. A steering column as set forth in claim 12 wherein each of said first portions of said first and second members includes a plurality of teeth engageable with said plurality of teeth on said tilt lock bar.

14. A steering column as set forth in claim 1 wherein said tilt lock bar is pivotally connected to a housing rotatably supporting said first steering column member.

15. A steering column connectable with a frame of a vehicle, said steering column comprising:

first and second steering column members, said first steering column member being pivotable relative to said second steering column member, a tilt lock bar having an end portion movable with said first steering column member relative to said second steering column member, said tilt lock bar moving relative to said second steering column member upon pivoting of said first steering column member to any one of a plurality of pivot positions relative to said second steering column member;

locking means for applying a first force to said tilt lock bar to prevent movement of said tilt lock bar relative to said second steering column member and pivoting of said first steering column member relative to said second steering column member, said locking means including means for applying a second force to said tilt lock bar greater than said first force when a load is applied to said first steering column member urging said first steering column member to pivot relative to said second steering column member.

16. A steering column as set forth in claim 15 wherein said locking means includes a member engageable with said tilt lock bar, said member being pivotable about a pivot axis spaced from said tilt lock bar, said member having a portion engageable with said tilt lock bar.

17. A steering column as set forth in claim 16 wherein said portion has a plurality of teeth engageable with a plurality of teeth on said tilt lock bar.

18. A steering column as set forth in claim 17 further including spring means applying said first force urging said portion of said member toward engagement with said tilt lock bar.

19. A steering column a set forth in claim 18 wherein said teeth on said tilt lock bar apply a force to urge said portion of said member to pivot toward said tilt lock bar when the load urges said first steering column member to pivot relative to said second steering column member.

20. A steering column as set forth in claim 15 wherein said tilt lock bar is pivotally connected to a housing rotatably supporting said first steering column member.

* * * * *